US008794493B2

(12) United States Patent
Cauley et al.

(10) Patent No.: US 8,794,493 B2
(45) Date of Patent: Aug. 5, 2014

(54) BICYCLE SUPPORT BAR

(76) Inventors: Glenn Cauley, West Mifflin, PA (US); Michelle Gwynn, South Park, PA (US)

( * ) Notice: Subject to any disclaimer, the term of this patent is extended or adjusted under 35 U.S.C. 154(b) by 84 days.

(21) Appl. No.: 13/342,780

(22) Filed: Jan. 3, 2012

(65) Prior Publication Data

US 2013/0168425 A1 Jul. 4, 2013

(51) Int. Cl.
*B60R 9/00* (2006.01)
(52) U.S. Cl.
USPC ............ 224/403; 224/557; 224/568; 224/924
(58) Field of Classification Search
USPC .............. 211/17–22; 224/557, 403, 924, 567, 224/568, 420, 545; 410/101; 248/205.2, 248/345.1
See application file for complete search history.

(56) References Cited

U.S. PATENT DOCUMENTS

| 764,774 | A | * | 7/1904 | Sargeant | 211/18 |
|---|---|---|---|---|---|
| 3,656,670 | A | * | 4/1972 | Hill | 224/554 |
| 4,057,182 | A | * | 11/1977 | Kolkhorst et al. | 224/403 |
| 5,447,241 | A | * | 9/1995 | Bureau | 211/18 |
| 6,129,078 | A | * | 10/2000 | Moulder | 126/40 |
| 6,604,898 | B2 | * | 8/2003 | Price | 410/102 |
| 6,769,659 | B1 | * | 8/2004 | Martello | 248/311.2 |
| 7,165,704 | B2 | * | 1/2007 | Lo | 224/499 |
| 7,490,806 | B2 | * | 2/2009 | Rioux | 248/345.1 |
| 7,669,822 | B2 | * | 3/2010 | Kluge et al. | 248/308 |
| 7,712,614 | B2 | * | 5/2010 | Carlson et al. | 211/22 |
| 7,815,055 | B2 | * | 10/2010 | Lang | 211/18 |
| 8,118,202 | B1 | * | 2/2012 | Price | 224/403 |
| 8,231,035 | B1 | * | 7/2012 | Michael et al. | 224/403 |
| 8,496,148 | B2 | * | 7/2013 | Farney | 224/497 |
| 2003/0230608 | A1 | * | 12/2003 | Henry | 224/403 |
| 2003/0230611 | A1 | * | 12/2003 | Edgerly | 224/534 |
| 2004/0084491 | A1 | * | 5/2004 | Gibson | 224/403 |

FOREIGN PATENT DOCUMENTS

GB 2045707 A * 11/1980 .............. B62H 3/02

* cited by examiner

*Primary Examiner* — Justin Larson
*Assistant Examiner* — Phillip Schmidt

(57) ABSTRACT

Providing a transporting system for a bicycle with a bicycle support bar that includes securing the bicycle with both wheels still attached to the bicycle and in an upright position while traveling to your destination, in the back of a pickup truck bed. The bicycle support bar Securing system has an anchoring member of nuts and bolts that attach to the truck bed inside and under the truck bed rail. Once secured this will allow you to secure your bicycle by using the velcro straps that are attached and wrap around your bicycle frame to secure it into place. With the bicycle support bar this will allow you to travel with your bicycle fully in tacked in an upright position in the back of your pickup truck.

4 Claims, 4 Drawing Sheets

BICYCLE SUPPORT

BICYCLE SUPPORT

Fig. (1)

Inside the truck bed wheel well area.
Drawing Fig 4, 5, 6, 7

BICYCLE SUPPORT BAR

BACKGROUND OF THE INVENTION

The Bicycle Support Bar was invented due to lack of availability for a bicycle support when traveling with a pickup truck. Also with quick install and uninstalling purposes. And to travel with a fully assembled bicycle. When traveling with a bicycle while having a pickup truck we discovered that laying the bicycle down flat and or leaning the bicycle against the pickup truck walls was determined to create damage to the bicycle itself, and also it damaged the pickup truck bed. When people want to travel with their bicycles, removing one of the bicycle tires is one of the concerns in traveling with a bicycle(s). Inventing the bicycle support bar with the pickup truck in mind has been beneficial in how we experience traveling with bicycle(s).

Also making sure that the bicycle support bar is easy to install and uninstall and is Tonneau Cover friendly, when the bicycle support bar is not in use you can simply keep it in place with a tonneau cover and without removing the bicycle support bar. The bicycle support bar is very light weight and not a large piece of equipment in order to support a bicycle. The bicycle support bar is easy to store.

The nut and bolt hardware is included.

SUMMARY OF THE INVENTION

Many bicycle owners are also owners of pickup trucks. The pickup truck consumer has established a demand for bicycle support bars that can be easily installed in the back of their pickup trucks. The 2 primary issues for the use of this bicycle support bar are issue 1 is to have the bicycle in an upright position securing the bike while traveling in the back of a pickup truck. Issue 2 is the transporting of the bicycle(s) resting on both tires fully intact with no disassembling of the bicycle, this avoids damage to the bicycle and truck bed. While researching all bicycle racks and anything that has to do with stabilizing a bicycle and that stays fully assembled with no removal of tires etc. We found nothing like our product. There are racks out there that are too big and have you too remove your front tire. Our product is small, lightweight, easy to install as well as remove.

TECHNICAL FIELD OF INVENTION

Description

This invention relates to a support bar particularly for bicycles. The bicycle support bar is a completely assembled metal structure including and not limited to size, length, and or material make up. The bicycle support bar is a support system for a bicycle so that you can transport the bicycle to your destination, while the bicycle is in full tact, and no disassembling of the bicycle is necessary. The Bicycle support bar is for the owners of pickup trucks, and is to be installed in the back of the pickup truck bed with the hardware that is provided. Made out of metal with rubber protective areas and velcro strips to wrap around the bicycle structure to stabilize the bicycle into position.

BRIEF DESCRIPTION OF THE DRAWINGS

The bicycle support bar invention will be more fully described, by way of example, with reference to the drawings.

DETAILED DESCRIPTION OF THE DRAWINGS

Bicycle Support

Figure 1:
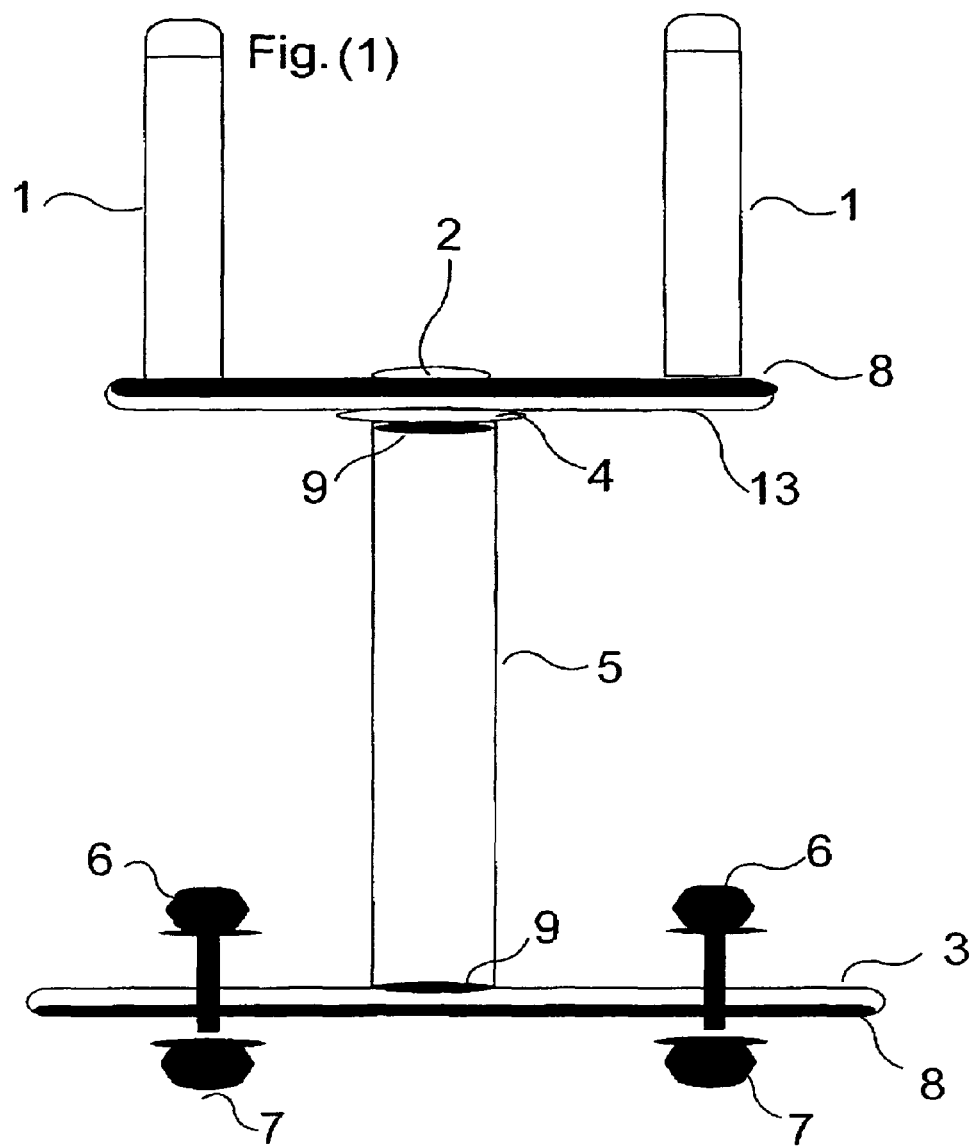
FIG. 1: is a perspective view of a bicycle support bar assembly according to the invention.
Figure 2:
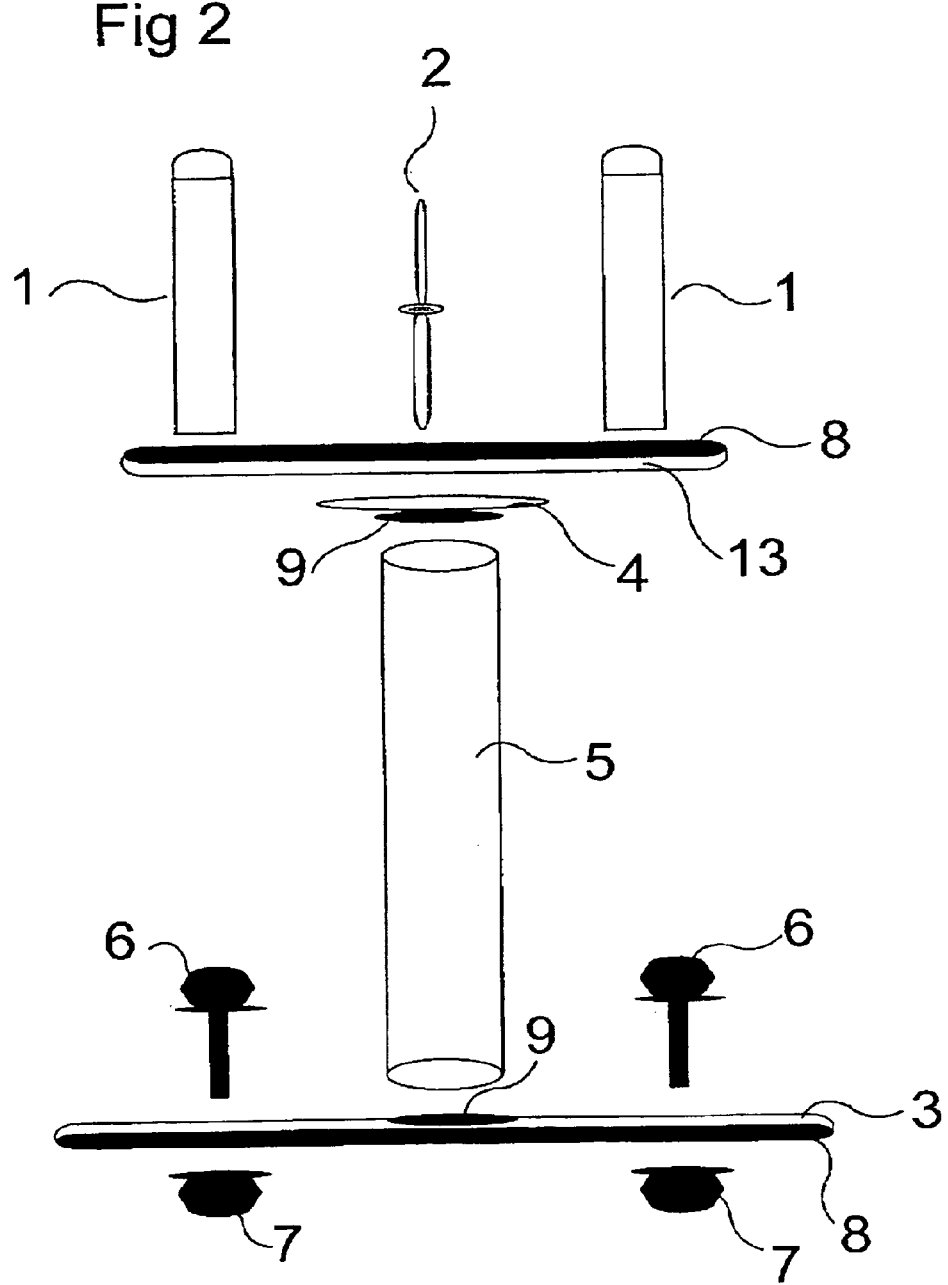
FIG. 2: is a side perspective view of the bicycle support bar showing rubber and velcro placement. Hardware placement.
Figure 3:
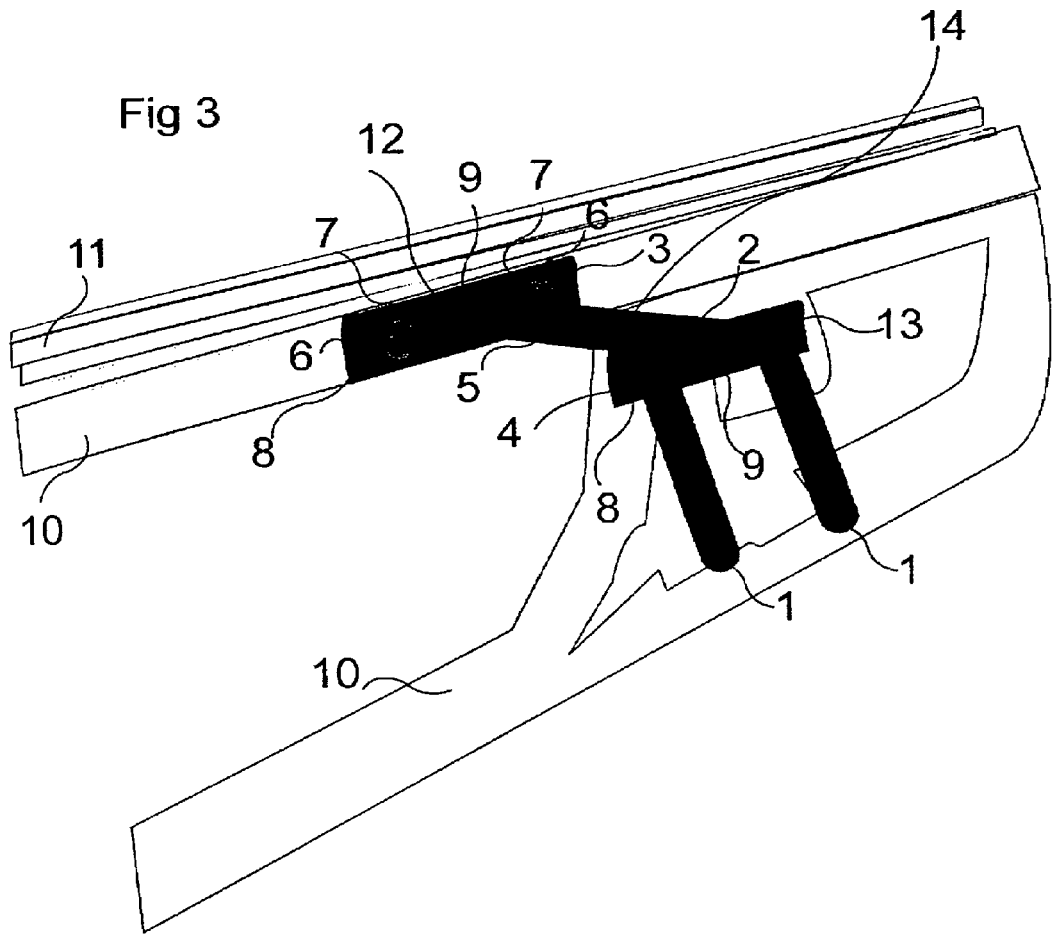
FIG. 3: is an exploded prospective view of the bicycle support bar assembly according to the present invention.
Figure 4:
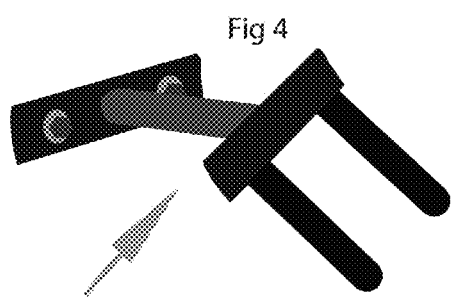
FIG. 4, 5: is a perspective drawing of the bicycle support bar installed into the pickup truck bed.
Figure 6:
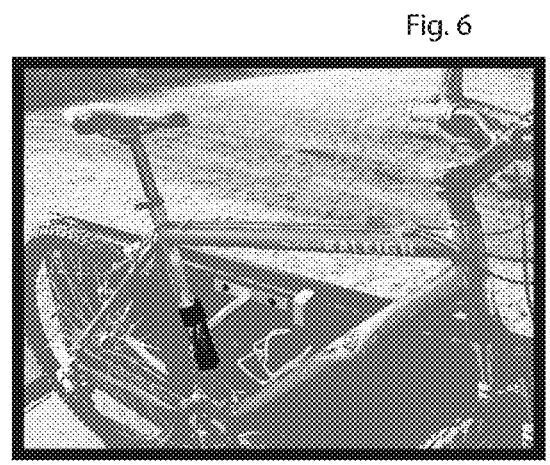
FIG. 6, 7 are photographs showing placement suggestions of the bicycle support bar.
Figure 5:
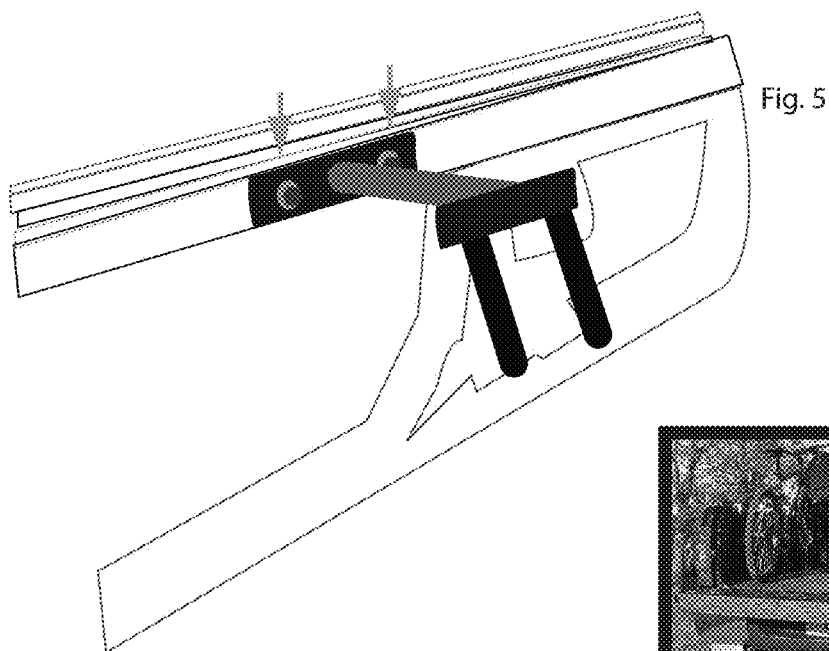
Figure 7:
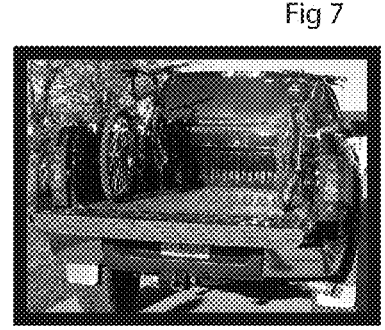

The present invention will be further described with reference to the accompanying drawing wherein like reference numerals refer to like parts in the several views, and wherein:

FIG. 1 is a vertical side view of a bicycle support according to the present invention shown FIG. 2 is a vertical exploded sectional view of the invention bicycle support of FIG. 1;

FIG. 3 is a vertical view of the invention bicycle support installed to the vertical surface of the inside of a pickup truck side frame

DETAILED DESCRIPTION

With reference to the Drawing, there is an illustrated bicycle support according to the present invention adapted to be attached to a vertical surface (surface FIG. 3 as illustrated), and then to support the a bicycle (not shown) upright and thereby support the bicycle upright with its wheels resting on a horizontal surface (not shown)

Generally, the bicycle support 14 complete bicycle support bar comprises: of a metal holding bar 3 and 9 attaches where it secures the structure and 8 rubber padding, includes a projection 5 pipe support part, having an inner support surface 5 pipe between its surfaces 3 metal holding bar and 9 attached, with the projection 5 pipe also includes 4 washer a retaining part and 9 attached that secures the structure, to 13 mounting bar with 8 rubber padding, the 13 mounting bar of the support part with 2 rivet swivel engaged assembly with 1 of (2) loop straps for securing the bicycle to the bicycle support bar 14 complete bicycle support bar is likely to receive.

Mounting means included in the bicycle support 14 complete bicycle support, supported on the surface 10 inside panel of truck bed and 11 top upper side panel of truck bed with their support surfaces, 14 complete bicycle support is adapted to receive. Thus, the bicycle support 14 complete bicycle support can support the bicycle support 10 inside panel of truck bed and 11 top upper side panel of truck bed, is mounted on a vertical surface with the 3 metal holding bar of the support parts extending horizontally 6 fasteners to 7 installation lock washer onto 10 inside panel of truck bed 12 Assembled to the inside of the pickup truck lip.

What is claimed is:

1. A bicycle support that is attachable to a vertical surface of an inside of a pick-up truck bed and supports a fully assembled bicycle with wheels of the bicycle resting on a horizontal surface of the pick-up truck bed, the bicycle support consisting essentially of:

a mounting bar that is a flat oblong plate with a first surface and second surface and is for securing the bicycle support as a whole assembly to the vertical surface of the pick-up truck bed, a pipe support piece having a fixed length pipe with a first end and second end, a rivet swiveling assembly, and a washer, and a holding bar that is a flat oblong plate with a first surface and second surface and is for securing the bicycle to the bicycle support, wherein the mounting bar has 2 holes for mounting fasteners and a protective layer that covers the entire first surface of the mounting bar, the first end of the pipe is non-rotatably attached to the second surface of the mounting bar, the second end of the pipe is non-releasably attached to the washer, the pipe the contains the rivet swiveling assembly and the rivet swiveling assembly is attached to the first surface of the holding bar such that the holding bar is able to rotate freely, the holding bar has loop fasteners to secure the bicycle support to the frame of a bicycle and a protective layer that covers the entire second surface of the mounting bar, and the loop fasteners have a first end attached to the holding bar and a second end configured to wrap completely around the frame of a bicycle and the holding bar to secure the bicycle to the holding bar.

2. A method of using a bicycle support comprising:

providing a bicycle support as in claim 1, mounting it on the vertical surface by drilling holes to side of the inside of a pick-up truck bed by placing the mounting bar flush against the vertical surface of inside of the pick-up truck bed to secure the mount of this using fasteners adjusting the support by rotating the holding bar about the swivel assembly to align with your bicycle frame, and securing the bicycle to the support by wrapping the loop fasteners around the bicycle and the bicycle frame and holding bar.

3. The bicycle support of claim 1, wherein the mounting bar is configured for mounting to the vertical surface of the inside of a pick-up truck bed, the pipe is connected to and projecting away from the mounting bar, the holding bar configured for holding a bicycle, the holding bar has a first end and a second end opposite the first end, and the holding bar attaches to the rivet swiveling assembly halfway between the first end and the second end.

4. The bicycle support of claim 1, wherein the loop fasteners have a flat end that attaches to the holding bar, the loop fasteners have a round end for wrapping around the frame and surface of a bicycle frame, the loop fasteners are configured to wrap on and around the surface of a bicycle frame and around the holding bar, an entire outward facing surface, the protective layers are rubber padding.

* * * * *